Patented Aug. 11, 1936

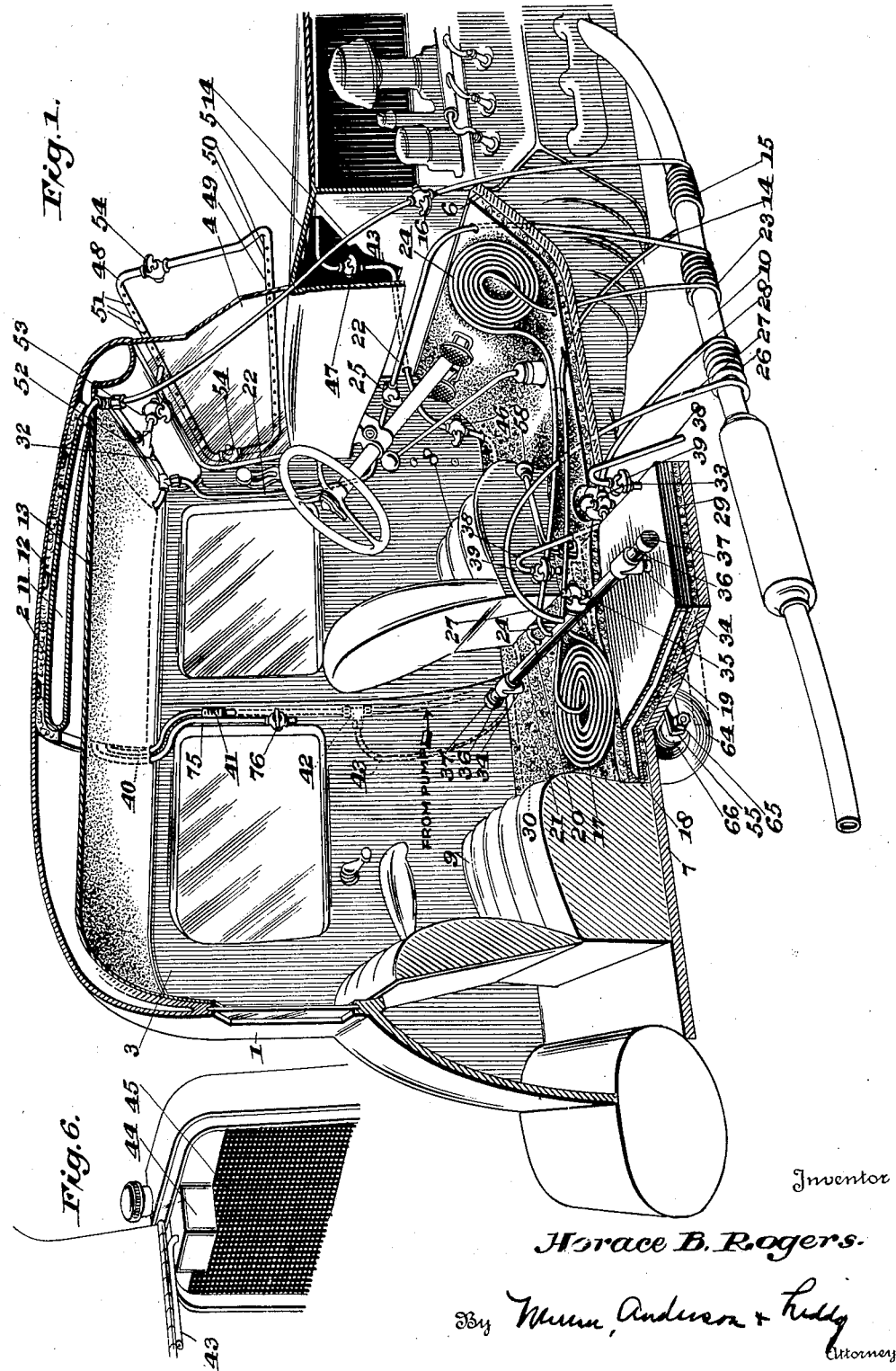

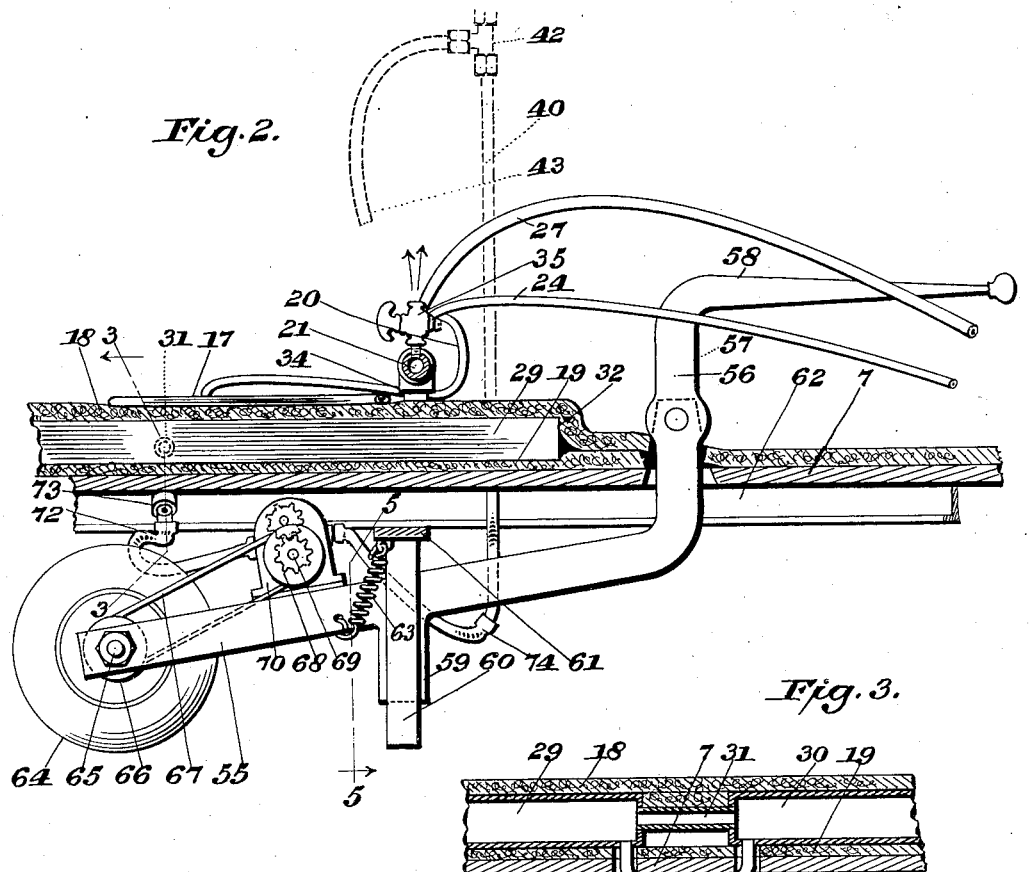

2,050,381

UNITED STATES PATENT OFFICE 2,050,381

AIR CONDITIONING APPARATUS FOR AUTOMOBILES

Horace B. Rogers, Norfolk, Va.

Application February 26, 1936, Serial No. 65,893

11 Claims. (Cl. 180—1)

This invention relates to improvements in air conditioning apparatuses for automobiles, it being a continuation in part of an application filed by Horace B. Rogers for Air conditioning and water supply means for automobiles, July 16, 1935, Serial #31,718, and its objects are as follows:

First, to provide an arrangement of tanks to constitute part of the floor of an automobile, said tanks containing water which is intended to be heated and remain warm for a long period because of its volume so as to warm the interior of the vehicle in cold weather, but also constitute a source of cool water to cool the interior in hot weather.

Second, to provide a tank in the top of the automobile which will be filled from said tanks in the bottom, the tank in the top serving the purpose of cooling the interior as stated.

Third, to provide mechanism which is of a comparatively simple nature, for pumping the water from the bottom tanks to the top tank when desired while the car is in motion.

Fourth, to provide a heated foot-rail which not only serves as a manifold for the various sizes of tubing from the coils on the exhaust pipe, but also acts as the source of vapor which is liberated into the automobile interior through a usually open pet-cock.

Fifth, to provide a device for spraying the windshield with water on the outside to assist in cooling the interior of the automobile on a hot day.

Sixth, to provide means whereby water may be supplied to the radiator while the automobile may be remote from a service station.

In the drawings;

Figure 1 is a sectional perspective view of those parts of an automobile with which the invention is concerned.

Figure 2 is a partially sectional and elevational view of the pump mechanism.

Figure 3 is a detail cross section taken on the line 3—3 of Fig. 2.

Figure 4 is a plan view of the structure in Fig. 2.

Figure 5 is a detail cross section taken on the line 5—5 of Fig. 2.

Figure 6 is a detail perspective view showing the filling means for the radiator.

In the drawings, the automobile to which the invention is applied is generally designated 1. This includes the top 2, side wall 3, windshield 4, cowl 5, front foot board 6, floor 7, front seat 8 (only one of the usual two being shown), back seat 9 and exhaust pipe 10. A tank 11 is located in the top 2 and is herein known as the top tank. This tank is molded to conform to the contour of the top, and to that end will vary in depth from approximately ½″ to several inches. This is made plain in Fig. 1. An insulating cover 12 of hair felt is placed over the top of the tank, only the usual lining 13 covering the bottom.

The water capacity of the top tank 11 is approximately 9 gallons. A ¼″ tubing 14 leads from the top tank under the cowl 5 to a coil 15 on the exhaust pipe 10. All of this tubing will be concealed in the side walls of the automobile. It has a valve 16 connected in it to control the supply of water to the coil. This valve is located under the cowl but within easy reach of the driver.

From the coil 15 the tubing 14 extends through the floor 7 to a coil pad 17 in the rear part of the automobile and in front of the seat 9. This coil is wound in helical form so as to lie flat on a hair felt sheet 18 which extends over most of the floor 7 and covers the foot board 6. Said sheet extends over the bottom tanks (presently described) which, in turn, rest on a similar sheet 19 laid on the floor 7 beneath said tanks. The coil pad 17 will embed itself in the sheet 18 to some extent because of its weight, but when it is stepped upon it will sink deeper thus guarding the wrappings of tubing against damage. The coil pad terminates at 20 at its place of connection with the tubular foot-rail 21.

An ⅛″ tubing 22 extends from the top tank 11 under the cowl 5 to a second coil 23 wound on the exhaust pipe 10. From here the tubing extends to a second coil pad 24 in the front part of the automobile and on the foot board 6. This pad, like the pad 17, is wound in helical form so as to lie flat, and when foot pressure is put upon it the wrappings sink into the felt sheet 18. The terminal 24 of the coil pad 24 is connected with the foot-rail 21. The tubing 22 has a valve 25 under the cowl 5 for controlling the water flow to the coil 23.

Of the two coil pads 17, 24, the pad 17 is the larger. This is due both to the ¼″ size of the tubing and to an increased number of wrappings. The pad 17 will be connected in circuit with the tank 11 by opening the valve 16 during suburban or cross-country driving. This provides plenty of heat for the inside of the automobile, out in the country where it is cold. For city driving the heat given off by the smaller coil pad 24 will be sufficient. This is connected in circuit with the tank 11 by opening the valve 25. The valve 16 is then kept closed. Any water remaining in the coil 15 will be converted into steam, due to the heat of the exhaust pipe 10, which will discharge into the foot-rail 21, leaving the coil 15 dry. The same is true of the coil 23, and a third which is presently described.

This third coil, now designated 26, consists of $\frac{5}{16}$" tubing wrapped around the exhaust pipe 10. It is the largest of the three coils on the exhaust pipe. One end of it terminates at 27 where it connects with the foot-rail 21. The other terminal 28 connects with one of the twin tanks 29, 30 beneath the floor 7. These tanks are coupled together by a nipple 31 (Figs. 2 and 3) to furnish communication. Said tanks lie on the floor of the rear compatment and since they cover practically the entire compartment they constitute part of the floor.

The felt sheet 18 covers the tanks, herein known as the bottom tanks, but this sheet is not so thick as to impede the escape of heat to the interior of the automobile. In practice the nether sheet 19 is much thicker than the sheet 18, so as to minimize the loss of heat through the floor. A valve 33 in the tubing 28 controls the flow of water into the coil 26. This coil is not connected in circuit with the bottom twin tanks unless it is desired to store a large quantity of hot water.

The capacity of these tanks is 6 gallons each, and this amount of hot water is sufficient to keep the inside of the automobile warm for a long period when standing idle in cold weather. Obviously at such a time the water content of the system must be in the twin tanks. The top tank 11 does not contain water until it is pumped there for the purposes of the coil pads 17, 24 to warm the interior of the automobile during driving in cool weather, or to cool the interior in summer as explained below.

It has been stated that the foot-rail 21 is a manifold because of its being the place of connection for the various sizes of tubing 20, 24 and 27. The foot-rail has pipe connections 34 at its opposite ends with the twin tanks, said connections being the supports of the rail. The latter is heated because of the inflow of hot water, and this aids in warming the inside of the automobile.

A pet-cock 35 is connected to the foot-rail. This is usually open, although not always, so as to liberate some vapor into the interior of the automobile. The foot-rail thus becomes the source of said vapor. Filling of the system is conveniently accomplished by providing a hose connection at each end of the rail 21. These can simply comprise threads 36 onto which the filling hose at the service station will be screwed. Normally the ends are capped as at 37.

Each tank 29, 30 has an overflow pipe 38 which also serves as an air vent. A valve 39 in each pipe is opened when filling occurs. The overflow pipes are directed through the floor 7. The tanks are full when water is seen to discharge on the ground.

Reverting to the top tank 11, filling is accomplished through a tube 40 which leads from the pumping means beneath the automobile. Inasmuch as the pumping means has its water source at the bottom tanks, the tube 40 and the elements coupled to it to complete a water passage, constitute a return connection between the top and bottom tanks. This tube connects with the top of the tank, letting the water flow over the hill, so to speak, under pump pressure, leaving the line substantially dry when the pump stops. The tube 40 has a rubber nipple 41 connected in it to act as a cushion between tank and pump and provides an emergency disconnection for direct filling of the top tank. A coupling 42 above said valve provides the place of connection of a tubing 43 which runs forwardly to a supplemental intake 44 (Fig. 6) of the radiator 45. The front of the top tank has a manifold 32 to which the various supply tubings are connected.

The tubing 43 constitutes a summer filling line for the radiator, and since it is connected with the top tank the water has an ample fall. This line has two valves 46, 47 one being under the cowl within reach of the driver, the other under the hood. The latter provides a double precaution against an uninitiated person leaving the service valve 46 open with the possibility of water with some traces of an anti-freeze solution entering the car system. If that were to happen, fumes from the solution would pollute the atmosphere and perhaps endanger the occupants. The necessity to open the valve 47 makes it compulsory to raise the hood, and with this performance to go through the driver is not likely to forget to again close the valve 47.

A spraying device 48 is located in front of the windshield 4 in close proximity thereto. This is a continuous tubing in rectangular form. The lower portion 49 is bent outwardly so that the jets of water from the holes 50 will strike the windshield glass quite sharply. Similar holes 51 in the top portion of the device direct their jets of water downwardly onto the glass. A pipe 52 supplies the device with water from the top tank 11. The flow is controlled by a valve 53. Unless the side valves 54 in the upright branches of the device are opened, the discharge of water will be confined to the top holes.

The pumping mechanism, shown in detail in Figs. 2 and 4, consists of a frame 55 which in part takes the form of a yoke, (Fig. 4) and then extends upwardly through the floor 7 where it is pivoted at 56 to a pair of brackets 57 beside the seat 8. The frame terminates in a hand lever 58 which is movable between the two front seats, and subject to manipulation by the driver. The frame has a substantially V-shaped friction member 59 which is drawn up into contact with spring arms 60 pendent from a transversely extending member 61 which is carried by the automobile frame 62.

A spring 63, connected between the frame 55 and member 61, assists in holding the frame up and its ground wheel 64 out of contact with the road. This wheel has trunnions 65 one of which carries a pulley 66 which is connected by a belt 67 with a pulley 68 on the shaft 69 of a pump 70. This pump is preferably of the gear type, and is mounted on a base 71 that forms part of the frame 55.

The pump 70 is connected on one side with one of the twin tanks 29, 30 by a flexible hose 72. The actual connection is made with a Y-fitting 73 (Fig. 3) which branches off to the two tanks. The other side of the pump is connected with the tube 40 (Fig. 1) by means of a flexible hose 74. In reference to the top tank 11, it is further noted that this has an air vent pipe 75 (Fig. 1) which extends from a point high up in the tank to a convenient place of discharge where it is fitted with a valve 76 which is normally closed.

The operation is readily understood. For winter driving, or during cool periods in other seasons of the year, use is made of the coil pads 17, 24 and twin tanks 29, 30. The latter are assumed to be filled with water to capacity. Filling is accomplished by removing either cap 37 and screwing the filling hose on. The driver will raise the hand lever 58 while the automobile is in motion, thus contacting the wheel 64 with the ground. The water passes the check valve 41 on its up-flow to the top tank, the latter being filled in a short time.

For city driving open the valve 25. The circulation of water through the coils 23, 24 supplies enough heat in the automobile for ordinary purposes. For suburban driving open the valve 16 so that water can circulate through the coils 15, 17. These being larger than the others will supply more heat. For city driving in very cold weather both valves 16, 25 are opened so that both sets of coils are brought into play at one time. If the top tank becomes exhausted of water at any time, it is the work of only a moment to replenish the supply for the gravity feed to the sets of coils mentioned.

For driving in extremely cold weather use is made of the twin tanks 29, 30. These have a large volume of water which when once heated by the coil 26 upon opening the valve 33, supplies a large amount of heat. Water does not escape from the open pet-cock 35 at any time because its orifice is higher than the foot-rail 21. One of the principal advantages of the twin tanks lies in heated) will be pumped into the top tank 11 by their storage of hot water for standing periods of the automobile. The slowly escaping heat keeps the interior of the car tempered for a long while, so that when the driver returns he will have a pleasant and agreeable atmosphere to step into.

For driving in summer, water (not previously causing operation of the pump 70. The valve 53 will be opened, and also the side valves 54 if desired, to direct jets of water against the windshield 4. The evaporation of the water will be attended by a cooling of the immediate atmosphere, which, being moist, and blowing back into the car, will make driving most agreeable. A further advantage of the water jets upon the windshield is their aid in washing off the remains of insects that strike against the glass in fast driving.

Under all driving conditions, whether in winter or summer, the interior of the automobile is easily humidified by opening the pet-cock 35. This is usually open so as to continuously discharge vapor into the car. The moisture content of the car is subject to fine adjustment at the pet-cock 35, and the interior temperature is similarly subject to fine adjustment by the various heat valves 16, 25 and 33.

When parking the car in the summer the driver will see to it that all water is drained out of the top tank 11 into the bottom twin tanks 29, 30. This is done by simply opening both gravity valves 16, 25 when leaving the car. Upon his return, the inside of the car will be as hot as any of the others, but upon driving off he will raise the hand lever 58 which act, after a short operation of the pump 70, will fill the top tank 11 with a large volume of now cool water. The entire superstructure of the car will be cooled after having traveled no more than a city block, and the proximity of the cool water gives the driver a sensation of comfort which is difficult to equal.

Once in a while a driver will find himself in need of additional water in the radiator 45 at a place remote from a service station. Upon such an occasion he will stop to raise the hood (Fig. 6) and open the valve 47 (Fig. 1) after having opened the interior valve 46. The water previously pumped into the top tank will flow by gravity to the radiator.

It is important to observe that under no circumstance is it possible for anything but clean water to enter the circulatory system of the car. Vapor given off at the pet-cock 35 will be wholesome and not contaminated with fumes of any kind. Engine gases are excluded because the coils 15, 23 and 26 make only a surface contact with the outside of the exhaust pipe 10.

The customary practice in driving around is to partly open the windows on one side of the car, those on the other side being closed. This creates a natural vacuum in the rear window with a natural expulsion of air from the front window. The vacuum in the rear open window pulls the air continually in from the air stream that comes from the evaporation zone at the windshield, resulting in a steady cooling of the atmosphere.

At this point another advantageous feature of the spraying device 48 is to be noted. In winter driving it is not unusual that sleet storms are run into. The most effective remedy for a sleet-covered windshield is to get out and scrape the ice off. But according to this system, the driver has only to fill the top tank with hot water and periodically open the valve 53. This will discharge a spray of hot water against the glass and melt the ice off in short order. This is a remedy for extreme conditions. Under all ordinary circumstances the internal circulation of warm, moist air so warms the glass that vision out of the windshield and rear window is quite clear, the warmth melting the snow and sleet on the outside.

I claim:

1. The combination with an automobile having a top and an exhaust pipe, of a water tank located in said top, and a coil in contact with said pipe, a coil pad on the interior of the automobile having one of its ends connected with the exhaust pipe coil for the inflow of hot water, a valved tubing connecting the other end of the exhaust pipe coil with the tank to supply the water, a bottom tank on the approximate floor level of the automobile into which the other end of the coil pad discharges, and means which provides a return connection between the top and bottom tanks.

2. The combination with an automobile having a top and an exhaust pipe, of a water tank located in said top and a coil in contact with said pipe, a coil pad on the interior of the automobile having one of its ends connected with the exhaust pipe coil for the inflow of hot water, a valved tubing connecting the other end of the exhaust pipe coil with the tank to supply the water, a tank on the approximate floor level of the automobile into which the other end of the coil pad discharges, and pumping means for returning the water from the bottom tank to the top tank.

3. The combination with an automobile having a top and an exhaust pipe, of a water tank located in the top, a heating coil in contact with the exhaust pipe, a coil pad on the inside of the automobile having one of its ends connected with one end of the heating coil for the inflow of hot water, a valved tubing connecting the other end of the heating coil with the tank for the supply of water, a bottom tank at the approximate floor level of the automobile to receive the water from the coil pad, a tubular foot-rail connected with said bottom tank and having the opposite end of the coil pad connected thereto, and means which provides a return connection between the top and bottom tanks.

4. The combination with an automobile having a top and an exhaust pipe, of a water tank located in the top, a heating coil in contact with the exhaust pipe, a coil pad on the inside of the automobile having one of its ends connected with one end of the heating coil for the inflow of hot water, a valved tubing connecting the other end of the heating coil with the top tank for the supply of water, a bottom tank at the approximate floor level of the automobile to receive the water from the coil pad, a tubular foot-rail connected with said bottom tank and having the opposite end of the coil pad connected thereto, means which provides a return connection between the top and bottom tanks and a pet-cock connected to said tubular foot-rail and opening into the interior of the automobile for liberating vapor to humidify the internal atmosphere.

5. The combination with an automobile having a top and an exhaust pipe, of a water tank located in the top, first and second heating coils in contact with the exhaust pipe, a pair of coil pads on the inside of the automobile, each having one end connected with the respective heating coils, valved tubings connecting the other ends of the heating coils with the top tank for a gravity feed of water, a bottom tank located at the approximate floor level of the automobile providing a common reservoir for the water circulating through the coil pads, means which provides a return connection between the top and bottom tanks and a tubular foot-rail connected with the bottom tank and having the remaining ends of the coil pads connected thereto, thereby serving as a manifold.

6. The combination with an automobile having a top, a floor and an exhaust pipe, of a tank located in the top, a heating coil wrapped around the exhaust pipe, a coil pad on the inside of the automobile having one of its ends connected with the heating coil, a valved tubing connecting the other end of the heating coil with the tank, a bottom tank at the approximate floor level of the automobile into which the opposite end of the coil pad discharges, means which provides a return connection between the top and bottom tanks and a felt sheet on the floor, covering the bottom tank and supporting the coil pad, the latter being adapted to sink into the felt sheet when stepped upon.

7. The combination with an automobile having a floor and an exhaust pipe, of a bottom tank located on the floor so that the top of the tank becomes a substitute part of the floor, a heating coil in contact with the exhaust pipe, a valved connection between one end of the coil and the bottom tank, a tubular foot-rail above said tank and in communication therewith, and a connection between the opposite end of the coil and said foot-rail.

8. The combination with an automobile having a top, floor and exhaust pipe, of a tank located in the top, a bottom tank at the approximate floor level so that the top of said bottom tank forms a continuation of the floor, a coil pad on the inside of the automobile, at least two heating coils in contact with the exhaust pipe, a valved tubing connecting the top tank with one heating coil to supply water to be heated, the opposite end of said heating coil being connected with one end of the coil pad to heat the interior of the automobile during driving, the remaining end of the coil pad discharging into the bottom tank, a valved connection between the bottom tank and one end of the other heating coil, the opposite end of said other coil communicating with the bottom tank so as to enable a circulation for the storage of hot water in the bottom tank to warm the interior of the automobile when standing, means which provides a return connection between the top and bottom tanks and means for liberating some of the vapor from the heating system to humidify the interior of the automobile.

9. The combination with an automobile having a top and a windshield, of a water tank located in said top, a spray device disposed in front of the windshield, said device comprising a continuous tubing in rectangular form, the upper and lower portions of which have holes, a valved connection between the tank and spray device for enabling the discharge of jets of water from the top portion against the windshield, and valves in the sides of the spray device for controlling the discharge of water from the holes in the lower portion.

10. The combination with an automobile, of two vertically spaced but connected tubes carried by the automobile, a frame beneath the floor, said frame extending to a pivot which is carried by the automobile floor wherefrom said frame extends off in the form of a hand lever, a friction wheel carried by the frame, means to hold the frame so as to support the wheel from the ground, said hand lever being operable to move the frame away from said means and the friction wheel into contact with the ground, a pump carried by the frame and having means in connection with the friction wheel for its operation when the automobile is in motion, and connections between the bottom tank, pump and top tank for pumping water from the bottom tank to the top tank.

11. The combination with an automobile having a radiator and an exhaust pipe, top and bottom tanks carried by the automobile, respectively disposed above and below the top of the radiator, a heating coil in contact with the exhaust pipe and having one of its ends connected with the bottom tank, means by which the other end of the coil is also connected with the bottom tank, said means including a pet cock which when open will liberate water vapor into the automobile interior, water pumping means and a tubing for conducting the pumped water from the bottom tank to the top tank while the automobile is in motion, a second tubing coupled to the conducting tubing to lead water from the top tank to the radiator, a service valve in said second tubing on the inside of the automobile to be opened preparatory to filling the radiator from the top tank, and a second valve so located in said second tubing as to necessitate raising the engine compartment hood for access to open said valve, thereby serving as a reminder to close said second valve and so avoid the possibility of the pumping means discharging impure water from the radiator into the top tank and, eventually, liberating contaminated vapor into said interior.

HORACE B. ROGERS.